May 3, 1949.　　　　L. R. PAUN　　　　2,469,075
VIBRATION ELIMINATING SUPPORT
FOR STEERING COLUMNS
Filed Feb. 12, 1948
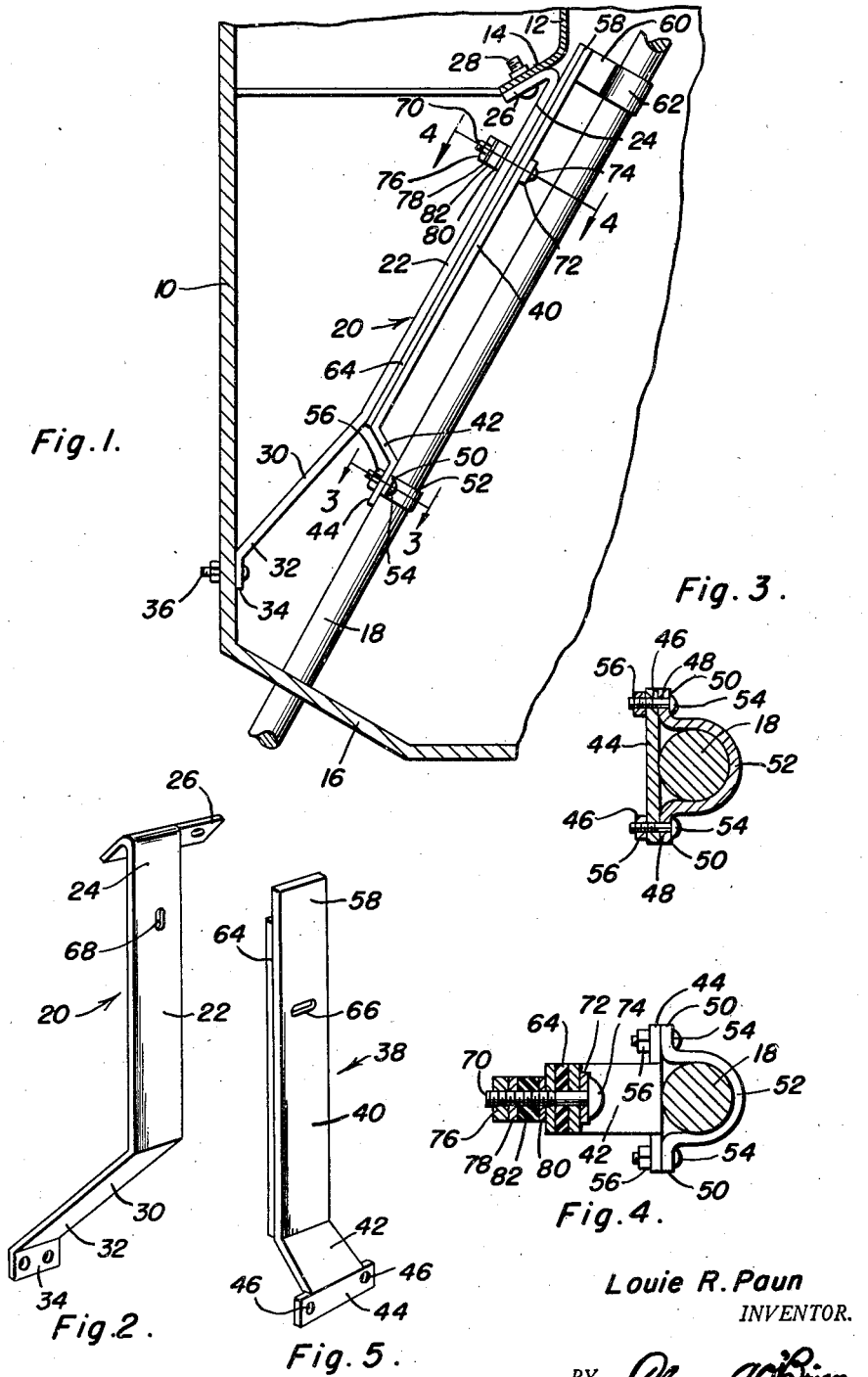
Louie R. Paun
INVENTOR.

Patented May 3, 1949

2,469,075

UNITED STATES PATENT OFFICE 2,469,075

VIBRATION ELIMINATING SUPPORT FOR STEERING COLUMNS

Louie R. Paun, Granton, Wis.

Application February 12, 1948, Serial No. 7,973

4 Claims. (Cl. 180—90)

This invention relates to new and useful improvements in vibration eliminators and the primary object of the present invention is to provide a device for reducing and eliminating the shock prevalent in the gauge holding panel of a vehicle as the vehicle is in motion.

Another important object of the present invention is to provide a vibration eliminator for the dash board of vehicles so designed as to prevent cracking, breaking or undesirable vibration in the gauge holding panel of a vehicle which normally results in the inefficient operation of the gauges supported on the said panel.

A further object of the present invention is to provide a novel and improved vibration eliminator for vehicles that is quickly and readily applied to or removed from the interior of a vehicle to cushion and support the steering column of the vehicle to the dashboard.

A still further aim of the present invention is to provide a vibration eliminator for the dashboard of vehicles that is small and compact in structure, strong and reliable in use, simple and practical in construction, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary vertical sectional view of the forward end of a vehicle, and showing the present invention in use therewith;

Figure 2 is a perspective view of the brace member used in conjunction with the present invention;

Figure 3 is an enlarged sectional view taken substantially on the plane of section line 3—3 of Figure 1;

Figure 4 is an enlarged sectional view taken substantially on the plane of section line 4—4 of Figure 1; and, Figure 5 is a perspective view of the support member used in conjunction with the present invention.

Referring now to the drawings in detail, wherein for the purpose of illustration, there is disclosed a preferred embodiment of the present invention, the numeral 10 represents the substantially vertical dashboard of a vehicle which supports a rearwardly extending gauge holding panel 12 the lower edge of which is turned inwardly and forwardly to provide an inclined flanged portion 14. The lower portion of the dashboard 10 terminates in an inclined floor surface 16 that is formed with a suitable aperture through which the vehicle steering column 18 extends. It is noted that the column 18 is inclined relative to the dashboard 10 as shown best in Figure 1 of the drawings.

The present invention does not attempt to claim the above conventional structure but is merely an attachment that is to be used in conjunction with the same to reduce the normal shock transmitted to the gauge holding panel 12 as the vehicle is in motion.

To accomplish the desired results, there is provided a brace member that is designated generally by the numeral 20. This brace member 20 includes an elongated main or upper leg 22 the upper end 24 of which is preferably integrally formed with an angulated anchor strip or plate 26 that is removably secured by bolts and nuts 28 to the inclined flanged portion 14 of the gauge holding panel 12. The lower portion of the main leg 22 is turned inwardly to provide a lower leg 30 that is inclined relative to the main leg 22. The lower extremity 32 of the lower leg 30 is angulated to provide an attaching ear 34 that is removably secured by bolts and nuts 36 to the dashboard 10 to retain the main leg 22 spaced parallel to the steering column 18.

The numeral 38 represents the support member used in conjunction with the present invention generally, and is adjustably carried by the steering column in a manner presently to be described. This support member comprises a central substantially elongated rectangular portion 40 the lower end of which is angulated as at 42 to provide a lower offset portion 44. This offset portion 44 is formed with apertures 46 that oppose aperture 48 in the outwardly turned ends 50 of a substantially U-shaped clamp 52 that is slidably mounted on the steering column 18. Bolts 54 extend through the apertures 46 and 48 and receivably engage nuts 56 for holding the support 38 clampingly retained on the steering column, in a longitudinally adjusted position, with the portion 40 spaced parallel to the steering column 18 and the main leg 22.

Suitably fixed to the upper end 58 of the portion 40, is a spacer lug or plate 60 that fixedly engages a split sleeve or guide sleeve 62 that is slidably mounted on the steering column 18 for aiding in the retention of the portion 40 spaced parallel to the steering column 18.

Fixed by any suitable means to the forward inclined face of the portion 40, is an elongated cushion or rubber strip 64 that frictionally engages the opposing face of the main leg 22. The strip 64 and portion 40 are provided with opposing transverse slots 66 that register with a longitudinal slot 68 provided in the main leg 22. A bolt 70 extends through the slots 66 and 68, is provided with a washer 72 adjacent its head 74 that frictionally engages the rear face of the portion 40, and an adjustable nut 76 on its forward end for longitudinal and lateral adjustment of the main leg 22 and portion 40 relative to each other. A pair of washers 78 and 80 are mounted on the bolt 70 between the main leg 22 and the nut 76 and are disposed on opposite sides of a resilient washer 82 which is also carried by the bolt 70.

Obviously, from the foregoing description, the panel 12, dashboard 10 and steering column 18 are all connected to each other so as to reduce and distribute the normal vibrations in a single element as the vehicle is in motion with the strip 64 cushioning the engagement of the leg 22 with the portion 40.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a vehicle including a substantially vertical dashboard, a gauge holding panel spaced relative to the dashboard, and a steering column inclined relative to the dashboard; an inclined brace connecting the gauge holding panel to the dashboard, said brace having an elongated central portion spaced parallel to the longitudinal axis of the steering column, a support adjustably carried by the steering column, said support having a central portion spaced parallel to the central portion of said brace, means connecting the support to the brace, and a cushion member interposed between the support and the brace.

2. In a vehicle including a substantially vertical dashboard, a gauge holding panel spaced relative to the dashboard, and a steering column inclined relative to the dashboard; an inclined brace connecting the gauge holding panel to the dashboard, said brace having an elongated central portion spaced parallel to the longitudinal axis of the steering column, a support adjustably carried by the steering column, said support having a central portion spaced parallel to the central portion of said brace, said brace having a longitudinal slot, said support having a transverse slot registering with the longitudinal slot in said brace, and a fastener received in the slots provided in said support and said brace for adjusting said brace and said support longitudinally and laterally with respect to each other.

3. In a vehicle including a dashboard, a gauge holding panel spaced from the dashboard, and a steering column inclined relative to the dashboard; an elongated brace having its ends secured to said panel and said dashboard respectively, an elongated support, a laterally projecting slide at one end of said support embracing said steering column and slidable thereon, means for clamping the free end of said support to the steering column, means for retaining said support adjusted laterally and longitudinally with respect to the brace, and a cushioning strip interposed between said support and said brace.

4. The combination of claim 3 wherein said last named means includes a pair of perpendicularly arranged, registering slots provided in said support and said brace, and a fastener received in said slots.

LOUIE R. PAUN.

REFERENCES CITED

The following references are of record in the file of this patent:

UNITED STATES PATENTS

| Number | Name | Date |
|---|---|---|
| 2,226,656 | Best | Dec. 31, 1940 |
| 2,235,975 | Best | Mar. 25, 1941 |